United States Patent
Niiho et al.

(10) Patent No.: US 7,440,432 B2
(45) Date of Patent: Oct. 21, 2008

(54) WIRELESS ACCESS SYSTEM

(75) Inventors: Tsutomu Niiho, Katano (JP); Kouichi Masuda, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 532 days.

(21) Appl. No.: 10/546,729

(22) PCT Filed: Dec. 3, 2004

(86) PCT No.: PCT/JP2004/018022

§ 371 (c)(1),
(2), (4) Date: Aug. 24, 2005

(87) PCT Pub. No.: WO2005/067213

PCT Pub. Date: Jul. 21, 2005

(65) Prior Publication Data

US 2006/0198332 A1    Sep. 7, 2006

(30) Foreign Application Priority Data

Dec. 26, 2003   (JP) .............................. 2003-433102

(51) Int. Cl.
*H04Q 7/24* (2006.01)
(52) U.S. Cl. .................... 370/338; 370/312; 370/348; 370/349; 370/389; 370/400; 370/466; 370/469; 455/522; 455/444
(58) Field of Classification Search .................. 370/338, 370/312, 348, 349, 389, 400, 401, 466, 469; 398/58, 99, 100; 340/825; 455/522, 444
See application file for complete search history.

(56) References Cited

U.S. PATENT DOCUMENTS

| | | | |
|---|---|---|---|
| 6,393,032 B1 * | 5/2002 | Ikegami ...................... | 370/447 |
| 2002/0167920 A1 | 11/2002 | Miyazaki et al. | |
| 2004/0233877 A1 * | 11/2004 | Lee et al. .................... | 370/338 |

FOREIGN PATENT DOCUMENTS

| | | |
|---|---|---|
| JP | 6-197071 | 7/1994 |
| JP | 2001-244939 | 9/2001 |
| JP | 2002-64505 | 2/2002 |
| JP | 2002-217913 | 8/2002 |
| WO | 02/089413 | 11/2002 |

* cited by examiner

*Primary Examiner*—Matthew D. Anderson
*Assistant Examiner*—Shaima Q Aminzay
(74) *Attorney, Agent, or Firm*—Wenderoth, Lind & Ponack, L.L.P.

(57) ABSTRACT

A wireless access system is provided which prevents the occurrence of a hidden terminal problem and minimizes the reduction in throughput. In the wireless access system, an access point divides terminals into groups such that terminals in one group cannot recognize radio waves sent from terminals in another group, and performs communication with the terminals on a per-group basis. By this, the wireless access system avoids the occurrence of the hidden terminal problem. RTS/CTS packets used to avoid the occurrence of the hidden terminal problem are exchanged between the access point and the terminals on a per-group basis, whereby overhead is reduced and the reduction in throughput is minimized.

14 Claims, 11 Drawing Sheets

(a) ACCESS POINT (b) TERMINAL

WIRELESS ACCESS SYSTEM

BACKGROUND OF THE INVENTION

TECHNICAL FIELD

The present invention relates to a wireless access system used for a wireless LAN system and the like, and more particularly to a wireless access system which prevents the occurrence of a hidden terminal problem and minimizes the reduction in throughput.

BACKGROUND ART

Figure 11:
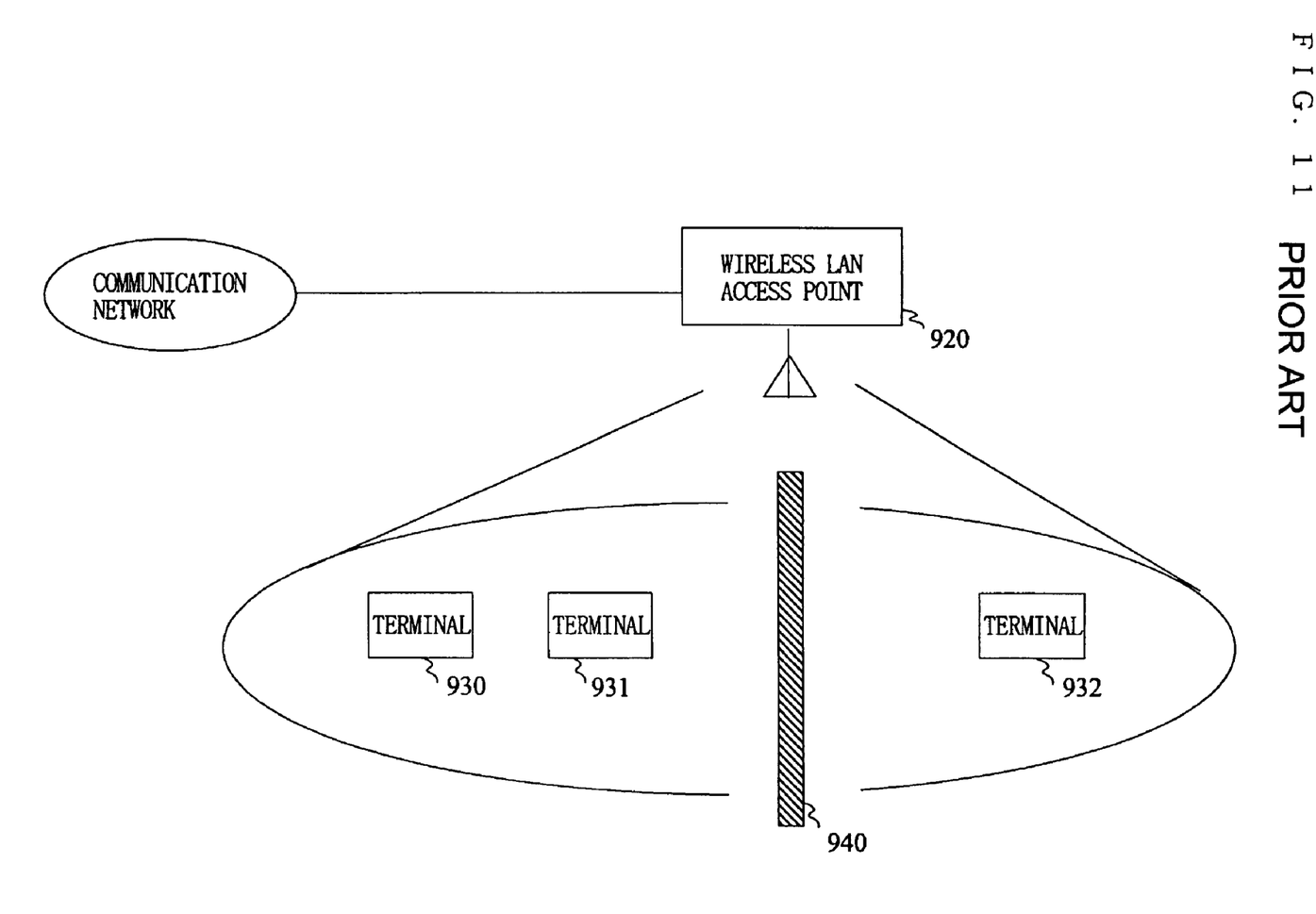
FIG. 11 is a diagram for explaining a hidden terminal problem in a conventional wireless LAN system.

FIG. 11 is a diagram for explaining a hidden terminal problem in a conventional wireless LAN system. In FIG. 11, the conventional wireless LAN system includes a wireless LAN access point 920 and a plurality of terminals 930 to 932. The conventional wireless LAN system employs a CSMA/CA scheme to prevent the collision of data transmitted between terminals. In such a wireless LAN system, however, if an obstacle 940 which blocks radio waves is present between the terminals, the terminal 932 cannot receive radio waves transmitted from the terminals 930 and 931. Furthermore, the terminals 930 and 931 cannot receive a radio wave transmitted from the terminal 932. Therefore, as viewed from the terminals 930 and 931, the terminal 932 is a hidden terminal. As viewed from the terminal 932, the terminals 930 and 931 are hidden terminals. That is, the so-called hidden terminal problem occurs in the wireless LAN system.

Figure 12:
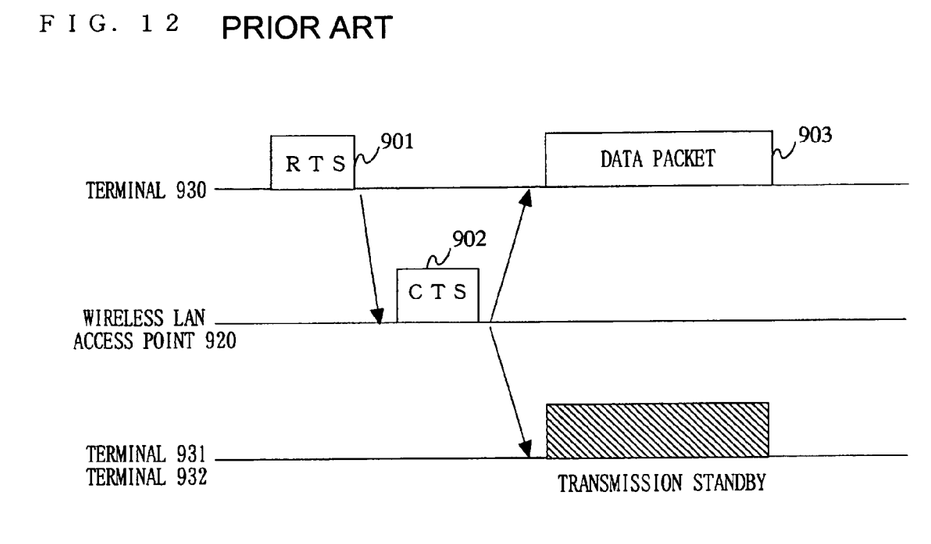
FIG. 12 is a diagram for explaining the operation of an RTS/CTS control scheme.

As one of the methods of solving the hidden terminal problem, there is an RTS/CTS control scheme. FIG. 12 is a diagram for explaining the operation of the RTS/CTS control scheme. In FIG. 12, a terminal 930 transmits, when beginning data transmission, an RTS packet 901 as a transmission request to an access point 920. Once the access point 920 has received the RTS packet 901, the access point 920 responds with a CTS packet 902 as a transmission permission to the terminal 930. Once the terminal 930 has received the CTS packet 902, the terminal 930 begins transmission of a data packet 903. The CTS packet 902 is also received by terminals 931 and 932. Once the terminals 931 and 932 have received the CTS packet 902, the terminals 931 and 932 go into a transmission standby state while the terminal 930 is transmitting the data packet 903. As described above, in a wireless LAN system employing the RTS/CTS control scheme, while a certain terminal is transmitting data, other terminals are prohibited from transmitting data. By doing so, the collision of transmitted data can be avoided between terminals which cannot receive from each other radio waves transmitted therefrom, and accordingly, the occurrence of the hidden terminal problem can be prevented.

Note, however, that in the wireless LAN system employing the RTS/CTS control scheme, each time data communication is performed between the access point 920 and the terminals 930 to 932, RTS/CTS packets need to be transmitted and received. Because of this, the time consumed by overhead other than data communication is increased, causing a reduction in throughput. As a system for preventing such a throughput reduction, conventionally, a wireless LAN system is disclosed which switches the communication mode depending on whether or not a hidden terminal is present among a plurality of terminals (for example, Patent Document 1).

A conventional wireless LAN system which switches the communication mode performs data communication between an access point and terminals using the RTS/CTS control scheme when a hidden terminal is present, or using the CSMA/CA scheme when there is no hidden terminal. This eliminates the need to transmit and receive RTS/CTS packets when there is no hidden terminal, making it possible to prevent a reduction in throughput.

[Patent Document 1] Japanese Laid-Open Patent Publication No. 2002-217913

BRIEF SUMMARY OF THE INVENTION

In the conventional wireless LAN system which switches the communication mode, however, when a hidden terminal is present, each time data communication is performed between the access point 920 and the terminals 930 to 932, RTS/CTS packets need to be transmitted and received. Hence, when a hidden terminal is present, the time consumed by overhead is increased after all, causing a reduction in throughput.

Therefore, an object of the present invention is to provide a wireless access system which prevents the occurrence of the hidden terminal problem even when terminals which cannot receive from each other radio waves transmitted therefrom are present, and which minimizes the reduction in throughput.

The present invention is directed to a wireless access system for performing transmission and reception of data using a radio wave. In order to attain the object mentioned above, a wireless access system of the present invention comprises a plurality of terminals and an access point. The plurality of terminals each perform transmission and reception of a radio wave in accordance with a predetermined instruction. The access point divides the plurality of terminals into groups so as to create a plurality of groups of terminals, and provides the predetermined instruction to give a communication permission, the plurality of groups each having terminals which can receive from each other radio waves transmitted therefrom, the communication permission allowing only one of the plurality of groups to communicate with the access point.

Preferably, the wireless access system further comprises at least one remote antenna which performs, in a location away from the access point, transmission and reception of a radio wave with any of the plurality of terminals; and a transmission line which connects between the remote antenna and the access point.

The transmission line may be an optical transmission line through which an optical signal is transmitted. In the case where the transmission line is an optical transmission line, the wireless access system may further comprise an electrical-optical/optical-electrical conversion section and an optical-electrical/electrical-optical conversion section. The electrical-optical/optical-electrical conversion section converts an electrical signal inputted via the access point into an optical signal and outputting the optical signal to the optical transmission line, and converts an optical signal inputted via the optical transmission line into an electrical signal and outputting the electrical signal to the access point. The optical-electrical/electrical-optical conversion section converts an optical signal inputted via the optical transmission line into an electrical signal and outputs the electrical signal to the remote antenna, and converts an electrical signal inputted via the remote antenna into an optical signal and outputs the optical signal to the optical transmission line. An optical fiber cable may be used for the optical transmission line. Further, free space may be used for the transmission line.

Preferably, the access point may provide, as the predetermined instruction, to the plurality of terminals specific information about and a communication permitted time for terminals which are included in a group to which the communication permission is given.

The access point may include a first group creation section. The first group creation section transmits a response request packet to each of the plurality of terminals in any order, receives, as a response to the response request packet, a response packet from each of the terminals, and then creates the plurality of groups based on specific information set in each of the received response packets.

In addition, the terminals each may include a second group creation section. The second group creation section sets, in the response packet, specific information about its own terminal and specific information received from other terminals, and responds to the access point with the response packet as a response to the response request packet received from the access point.

The access point may further include a first communication control section. The first communication control section sets, in a case where the access point receives from any of the plurality of terminals an RTS packet as a transmission request, specific information about and a communication permitted time for terminals which are included in a group from which the RTS packet has been transmitted, in a CTS packet as an instruction to give the communication permission, and transmits the CTS packet to the plurality of terminals.

The terminals each may further include a second communication control section. The second communication control section transmits, in a case where data to be transmitted is generated, the RTS packet to the access point, receives from the access point the CTS packet as a response to the RTS packet, and determines, if the specific information set in the received CTS packet contains specific information about its own terminal, that the communication permission is given to its own terminal, and performs communication with the access point for a period of the communication permitted time.

The access point may set a predetermined time for the communication permitted time. The access point may determine the communication permitted time in accordance with an instruction from an operator, or according to a number of terminals included in the plurality of groups. Alternatively, the access point may determine the communication permitted time according to an amount of transmission standby data held in the terminals included in the plurality of groups.

The present invention is also directed to a wireless access method of performing transmission and reception of data using a radio wave. In order to achieve the object mentioned above, a wireless access method of the present invention provides the following steps to an access point and a plurality of terminals. The access point performs the steps of: transmitting a response request packet to the plurality of terminals in any order; receiving, as a response to the response request packet, a response packet from each of the terminals; and creating the plurality of groups based on specific information set in each of the received response packets. The terminals each perform the steps of: receiving the response request packet from the access point; and setting, in the response packet, specific information about its own terminal and specific information received from other terminals, and responding to the accesspoint with the response packet as a response to the response request packet.

The access point may further perform the steps of: setting, in a case where the access point receives from any of the plurality of terminals an RTS packet as a transmission request, specific information about and a communication permitted time for terminals which are included in a group from which the RTS packet has been transmitted, in a OTS packet as an instruction to give the communication permission; and transmitting the OTS packet to the plurality of terminals. The terminals each may further perform the steps of: transmitting, in a case where data to be transmitted is generated, the RTS packet to the access point; receiving from the access point the CTS packet as a response to the RTS packet; and determining, if the specific information set in the received CTS packet contains specific information about its own terminal, that the communication permission is given to its own terminal, and performing communication with the access point for a period of the communication permitted time.

As described above, according to the present invention, the group creation section divides a plurality of terminals into groups so as to create groups of terminals, each group having terminals which can receive from each other radio waves transmitted therefrom. Then, the communication control section assigns a communication interval and a standby interval individually to each group, and controls communication between the access point and the terminals to be performed on a per-group basis. By doing so, the occurrence of the hidden terminal problem can be prevented between terminals which cannot receive from each other radio waves transmitted therefrom. Also, since RTS/CTS packets are transmitted and received on a per-group basis, the time consumed by overhead is reduced as compared with a method of transmitting and receiving RTS/CTS packets on a per-terminal basis, which is one of the conventional methods of solving the hidden terminal problem; accordingly, the reduction in throughput can be minimized.

DESCRIPTION OF THE REFERENCE CHARACTERS

10 COMMUNICATION NETWORK
11 COMMUNICATION LINB CABLE
12, 20, 31, 32 ACCESS POINT
12g, 13g GROUP CREATION SECTION
12c, 13c COMMUNICATION CONTROL SECTION
15 RADIO-WAVE SHIELD
21, 22 REMOTE ANTENNA
23 TRANSMISSION LINE
24, 28, 29, 34, 37 OPTICAL-ELECTRICAL/ELECTRICAL-OPTICAL CONVERSION SECTION
25, 26 REMOTE ANTENNA UNIT
27 OPTICAL TRANSMISSION LINE
33 SWITCH
131 to 133, 141 to 142 TERMINAL
P131 to P133, P141 to P142 PACKET
221 to 228 PACKET

DETAILED DESCRIPTION OF THE INVENTION

First Embodiment

Figure 1:
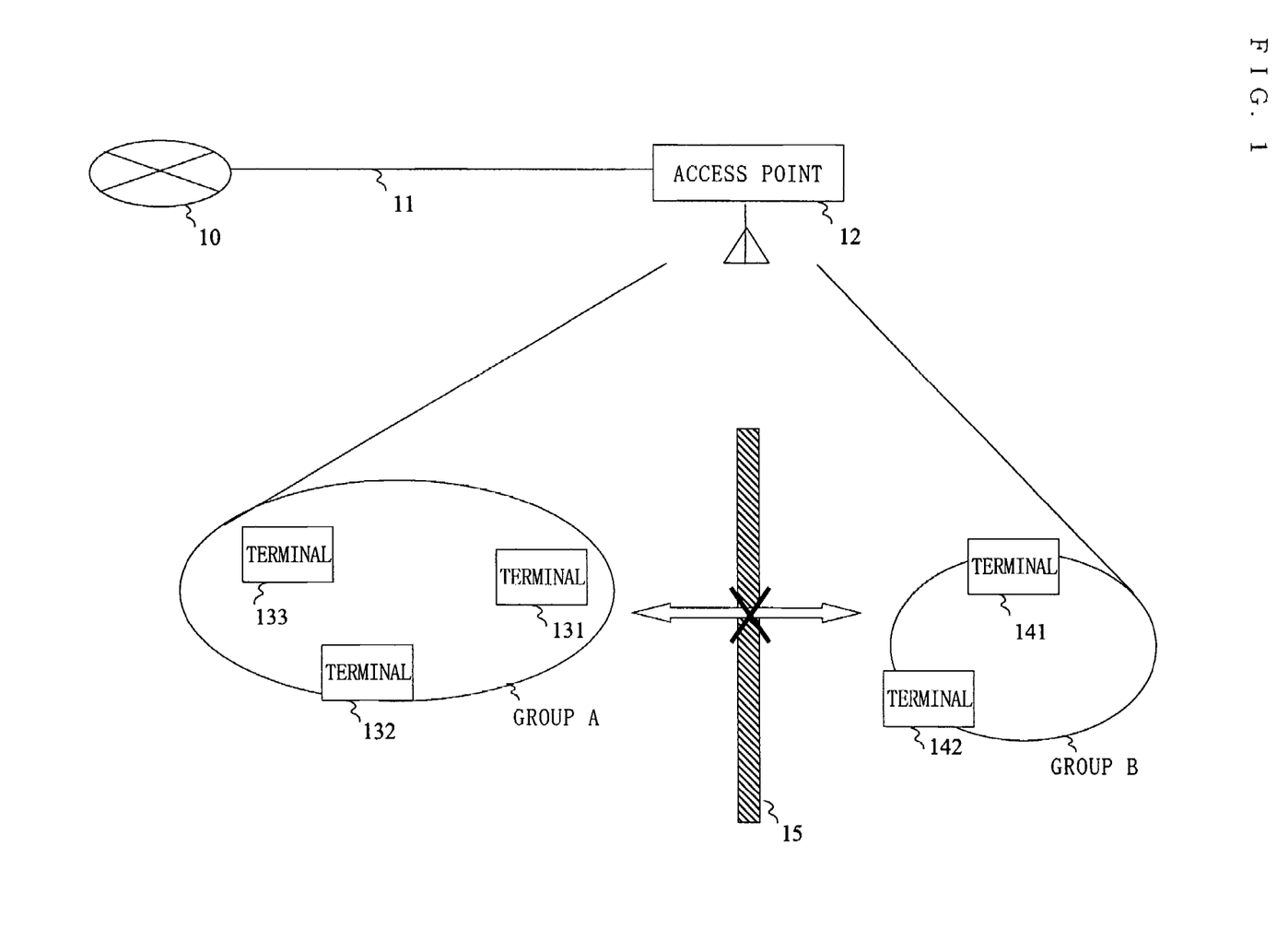
FIG. 1 is a block diagram showing an exemplary network configuration of a wireless access system according to a first embodiment of the present invention.

FIG. 1 is a diagram showing an exemplary network configuration of a wireless access system according to a first embodiment of the present invention. In FIG. 1, the wireless access system according to the first embodiment includes an access point 12 and a plurality of terminals 131 to 133 and 141 to 142. The access point 12 is connected to a communication network 10, such as an Internet network, through a communication cable 11.

The access point 12 converts an electrical signal inputted through the communication cable 11 into a radio signal and then transmits the radio signal to free space, and also converts a radio signal received from the terminals 131 to 133 and 141 to 142 into an electrical signal and then transmits the electrical signal to the communication cable 11. The terminals 131 to 133 and 141 to 142 each demodulate a radio signal received from the access point 12 and thereby obtain data, and also transmit, as a radio wave, a radio signal obtained by modulating data, to free space.

Now, the case is considered where a radio-wave shield 15 which blocks a radio wave is present between the terminals 131 to 133 and the terminals 141 to 142. In this case, the terminals 141 to 142 cannot receive radio waves transmitted from the terminals 131 to 133 because of the presence of the radio-wave shield 15. Similarly, the terminals 131 to 133 cannot receive radio waves transmitted from the terminals 141 to 142. That is, as viewed from the terminals 131 to 133, the terminals 141 to 142 are hidden terminals. As viewed from the terminals 141 to 142, the terminals 131 to 133 are hidden terminals.

The operation of the wireless access system according to the first embodiment of the present invention will be described below. In the wireless access system, first, the access point 12 creates a plurality of groups each having no hidden terminal, by grouping together terminals which can receive from each other radio waves transmitted therefrom. In this example, the access point 12 groups the terminals 131 to 133 as group A and the terminals 141 to 142 as group B.

Figure 2:
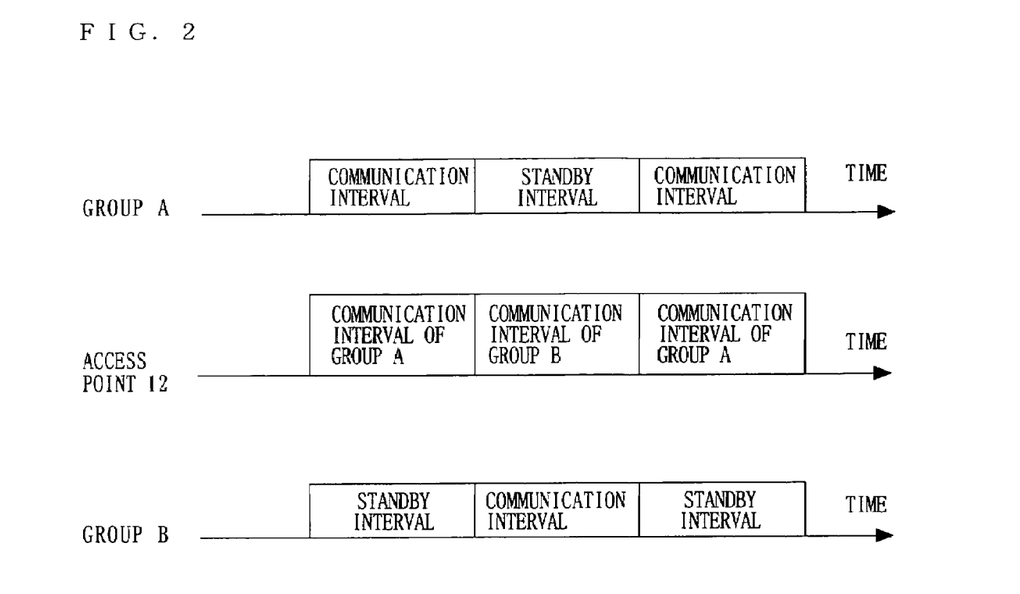
FIG. 2 is a diagram schematically showing a state in which communication is performed between an access point 12 and each group.

Next, the access point 12 assigns each group with a communication interval and a standby interval, and performs communication with the terminals on a per-group basis. FIG. 2 is a diagram schematically showing a state in which communication is performed between the access point 12 and each group. In FIG. 2, while the group A is performing communication with the access point 12, the group B stands by for communication with the access point 12. Similarly, while the group B is performing communication with the access point 12, the group A stands by for communication with the access point 12. This avoids the collision of radio waves transmitted between the groups A and B, and accordingly, the occurrence of the hidden terminal problem can be prevented.

The access point 12 determines the communication interval and the standby interval to be assigned to each group, according to the number of terminals belonging to each group. For example, in the case where there are three terminals belonging to the group A and two terminals belonging to the group B, the access point 12 can assign the group A with a three-second communication interval and the group B with a two-second communication interval.

Figure 3:
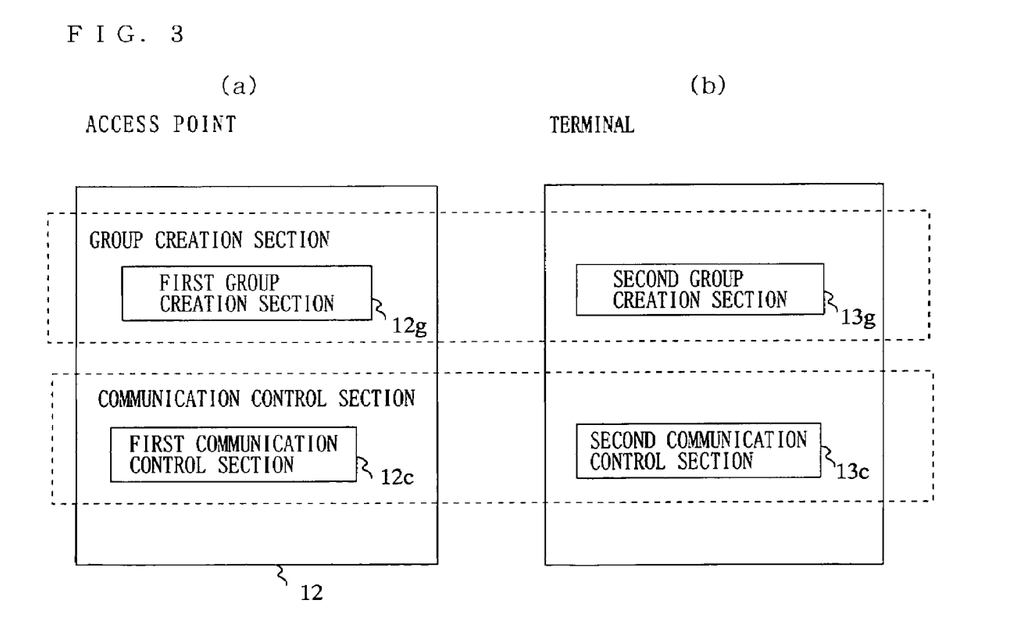
FIG. 3 is a block diagram showing an exemplary functional configuration of the wireless access system according to the first embodiment of the present invention.

FIG. 3 is a block diagram showing an exemplary functional configuration of the wireless access system according to the first embodiment of the present invention. FIG. 3(a) is a diagram showing a configuration of the access point 12. FIG. 3(b) is a diagram showing a configuration of the terminal. In FIG. 3, the access point 12 includes a first group creation section 12g and a first communication control section 12c. The terminal includes a second group creation section 13g and a second communication control section 13c.

In the wireless access system according to the first embodiment, the first group creation section 12g of the access point 12 and the second group creation section 13g of the terminal cooperatively create the aforementioned groups. Thus, a configuration in which the first group creation section 12g and the second group creation section 13g are combined together can also be simply taken as a group creation section. Also, the first communication control section 12c of the access point 12 and the second communication control section 13c of the terminal cooperatively control the aforementioned per-group communication. Thus, a configuration in which the first communication control section 12c and the second communication control section 13c are combined together can also be simply taken as a communication control section.

Figure 4:
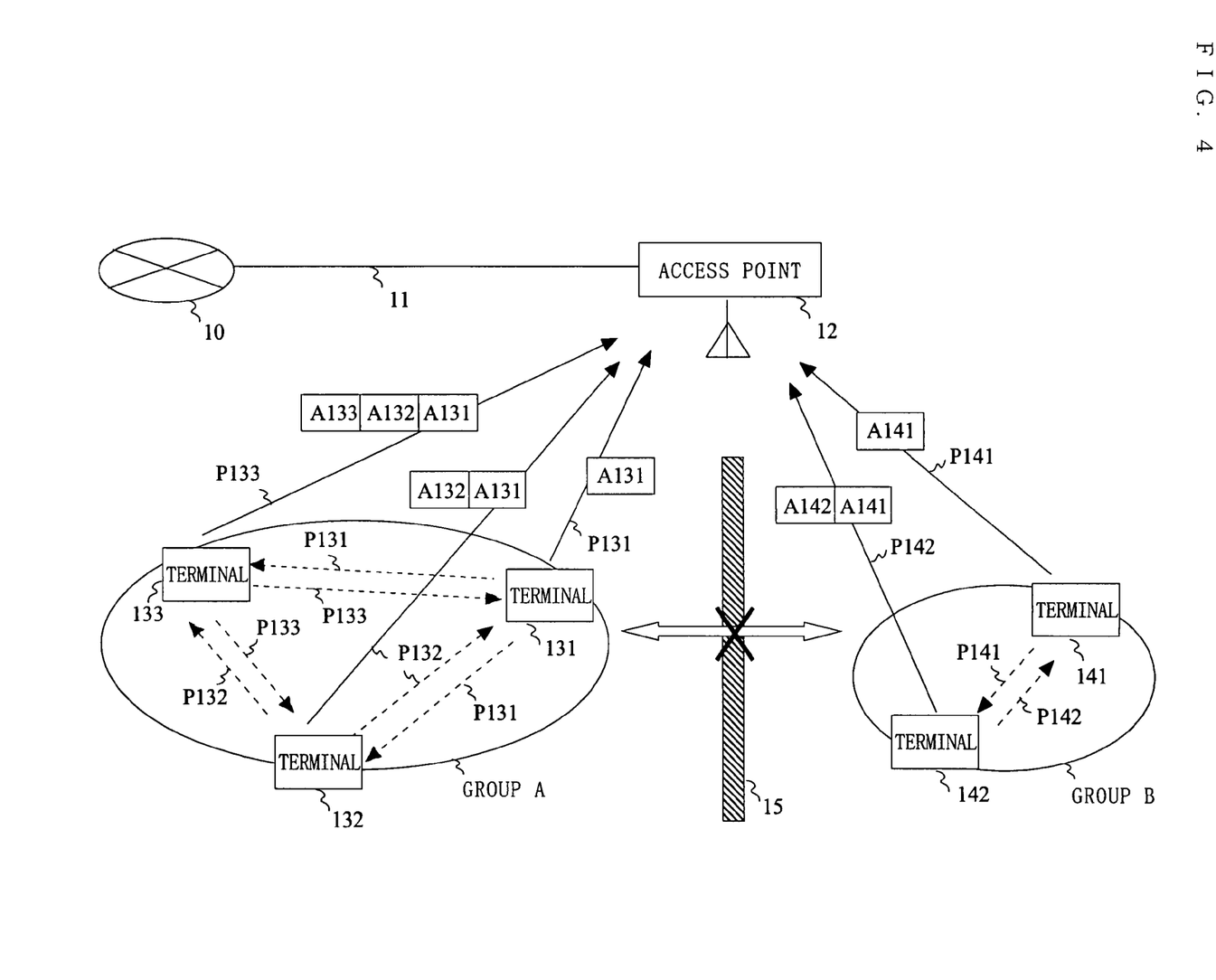
FIG. 4 is a diagram for explaining the operation of a group creation section according to the first embodiment.

FIG. 4 is a diagram for explaining the operation of the group creation section according to the first embodiment. Note that, in the description of FIG. 4, the operation of the first group creation section 12g is described as the operation of the access point 12 and the operation of the second group creation section 13g is described as the operation of the terminal. In FIG. 4, the access point 12 transmits, in turn, a response request packet to all the terminals 131 to 133 and 141 to 142 (not shown). The access point 12 can transmit a response request packet to the terminals in any order; here, a response request packet is transmitted to the terminals 131, 132, 133, 141, and 142 in this order.

Once the terminal 131 has received the response request packet from the access point 12, the terminal 131 responds to the access point 12 with a response packet P131 having set therein specific information (A131) about the terminal 131. The specific information (A131) about the terminal 131 includes, for example, an IP address and a MAC address set in the terminal 131. The response packet P131 is also received by other terminals within the reach of the radio wave. Specifically, the response packet P131 can also be received by the terminals 132 and 133. However, the response packet P131 cannot be received by the terminals 141 and 142.

Once the terminal 132 has received the response request packet from the access point 12, the terminal 132 responds to the access point 12 with a response packet P132 having set therein specific information (A132) about the terminal 132 and the specific information (A131) having been received so far. The response packet P132 can also be received by the terminals 131 and 133. Similarly, once the terminal 133 has received the response request packet from the access point 12, the terminal 133 responds to the access point 12 with a response packet P133 having set therein specific information (A133) about the terminal 133 and the specific information (A132, A131) having been received so far. That is, in the response packet P133, is set the specific information (A131 to A133) about all the terminals 131 to 133 which can receive from each other radio waves transmitted therefrom.

Once the terminal 141 has received the response request packet from the access point 12, the terminal 141 responds to the access point 12 with a response packet P141 having set therein specific information (B141) about the terminal 141 and specific information having been received so far. Note that the terminal 141 does not receive the response packets P131 to P133 because of the presence of the radio-wave shield 15. Therefore, in the response packet P141, is set only the specific information (B141) about the terminal 141. Similarly, the terminal 142 responds to the access point 12 with a response packet P142 having set therein specific information (B142) about the terminal 142 and the specific information (B141) having been received so far. That is, in the response packet P142, is set the specific information (B141 to B142) about all the terminals 141 to 142 which can receive from each other radio waves transmitted therefrom.

The access point 12 can identify which terminals can receive from each other radio waves transmitted therefrom, based on the packets P131 to P133 and P141 to P142 responded from the terminals 131 to 133 and 141 to 142. The access point 12 then creates a plurality of groups by grouping together terminals which can receive from each other radio waves transmitted therefrom. Specifically, the access point 12 groups the terminals 131 to 134 as group A based on the specific information set in the packet P133, and the terminals 141 to 142 as group B based on the specific information set in the packet P142.

Figure 5:
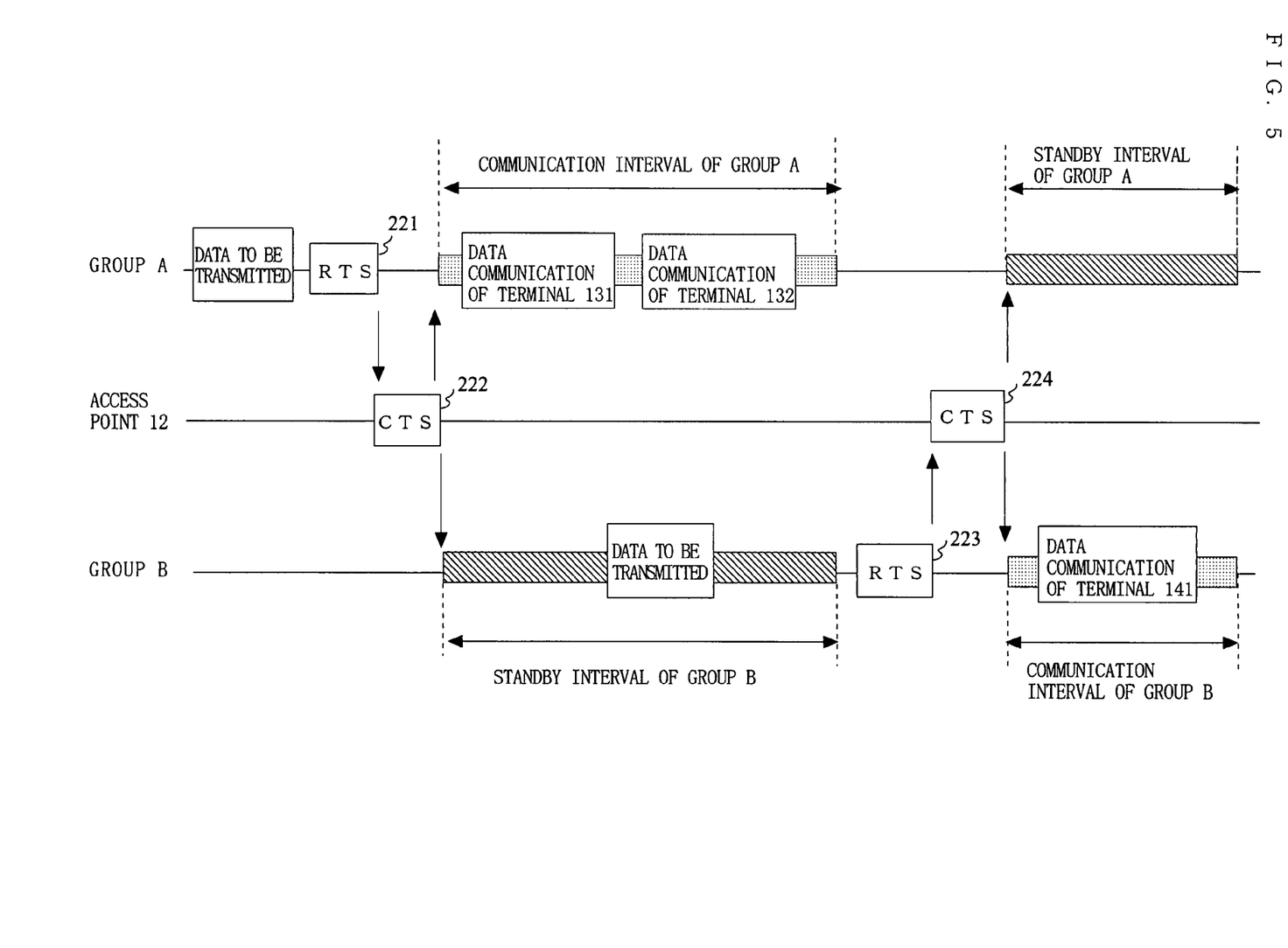
FIG. 5 is a diagram for explaining the operation of a communication control section according to the first embodiment.

FIG. 5 is a diagram for explaining the operation of the communication control section according to the first embodiment. Note that, in the description of FIG. 5, the operation of the first communication control section 12c is described as the operation of the access point 12 and the operation of the second communication control section 13c is described as the operation of the terminal. In FIG. 5, as a method of switching communication between the groups A and B, there is shown a method using RTS/CTS packets. Referring to FIG. 5, it is assumed that, after the terminals have been grouped, data to be transmitted is generated from one of the terminals belonging to the group A. In this case, in order to seek a transmission permission to the group A, the one of the terminals belonging to the group A transmits an RTS packet 221 to the access point 12. Once the access point 12 has received the RTS packet 221, the access point 12 responds with a CTS packet 222 as a transmission permission to the group A. In the CTS packet 222, is set specific information (A131 to 133) of all the terminals belonging to the group A and the length of a communication interval assigned to the group A. Note that the length of a communication interval refers to a period of time during which communication is permitted (a communication permitted time).

The CTS packet 222 is received by all the terminals 131 to 133 and 141 to 142 belonging to the groups A and B. The terminals 131 to 133 and 141 to 142 each determine whether or not the communication interval is assigned to a group to which the terminal belongs, based on whether or not specific information about the terminal is set in the received CTS packet 222. Since the specific information about the terminals 131 to 133 are set in the received CTS packet 222, the terminals 131 to 133 belonging to the group A determine that the communication interval is assigned to the group A. If it is determined to be in a communication interval, the terminals 131 to 133 belonging to the group A perform data communication with the access point 12 according to the CSMA/CA scheme until the communication interval ends.

The terminals 141 to 142 belonging to the group B, on the other hand, determine that the group B is in a standby interval since the specific information about the terminals 141 to 142 are not set in the received CTS packet 222. If it is determined to be in a standby interval, the terminals 141 to 142 belonging to the group B stand by for data communication with the access point 12 until the standby interval ends.

Now, the case is considered where data to be transmitted is generated from one of the terminals belonging to the group B during the standby interval of the group B. In this case, the one of the terminals belonging to the group B transmits an RTS packet 223 to the access point 12 after the standby interval ends. Once the access point 12 has received the RTS packet 223 from the terminal belonging to the group B, the access point 12 responds with a CTS packet 224 as a transmission permission to the group B. The terminals 141 to 142 belonging to the group B determine, by the reception of the CTS packet, that the terminals 141 to 142 are in a communication interval. On the other hand, the terminals 131 to 133 belonging to the group A determine, by the reception of the CTS packet 224, that the terminals 131 to 133 are in a standby interval. The wireless access system according to the first embodiment controls data communication between the access point 12 and the terminals 131 to 133 and 141 to 142 by repeating the aforementioned operation.

As described above, according to the wireless access system of the first embodiment, the group creation section divides a plurality of terminals into groups so as to create groups of terminals, each group having terminals which can receive from each other radio waves transmitted therefrom. Then, the communication control section assigns a communication interval and a standby interval individually to each group, and controls communication between the access point 12 and the terminals 131 to 133 and 141 to 142 to be performed on a per-group basis. By doing so, the wireless access system according to the first embodiment can prevent the occurrence of the hidden terminal problem between terminals which cannot receive from each other radio waves transmitted therefrom. Also, since RTS/CTS packets are transmitted and received on a per-group basis, the time consumed by overhead is reduced as compared with a method of transmitting and receiving RTS/CTS packets on a per-terminal basis, which is one of the conventional methods of solving the hidden terminal problem; accordingly, the reduction in throughput can be minimized.

Note that in the wireless access system according to the first embodiment the access point 12 may create, with the use of a method other than the aforementioned operation, a group where terminals which can receive from each other radio waves transmitted therefrom are grouped together. For example, a user can identify which terminals can receive from each other radio waves transmitted therefrom, in view of the radio-wave shield 15, the distance between terminals, or the like. The user instructs the access point 12 using such information. The access point 12 may group together terminals which can receive from each other radio waves transmitted therefrom, in accordance with the instruction from the user.

The access point 12 may transmit group information to all the terminals 131 to 133 and 141 to 142 at once after the grouping of the terminals is complete. In the group information, is set information indicating the group A, the group B, or the like. Each of the terminals 131 to 133 and 141 to 142 can identify, by the reception of the group information, which group the terminal belongs to. Therefore, when transmitting a communication permission to a terminal, the access point 12 can use group information instead of specific information about the terminal.

If the access point 12 has no ongoing data communication with terminals during a communication interval of a group over a certain period of time, the access point 12 may transmit a CTS packet to the terminals to forcefully terminate the communication interval of the group. By this, the wireless access system reduces a wasted assignment of a communication interval, and accordingly, efficient communication can be performed.

Although the access point 12 determines the communication interval and the standby interval to be assigned to each group, according to the number of terminals belonging to each group, such a determination may be made in accordance with the instruction from an operator. By this, the wireless access system can assign a communication interval and a standby interval to each group in compliance with the intention of the operator, making it possible to provide a more flexible system operation.

Furthermore, the access point 12 may determine the communication interval and the standby interval to be assigned to each group, according to a predetermined timing. In this case, the access point 12 notifies, after the grouping of terminals is complete, all the terminals 131 to 133 and 141 to 142 about a timing at which switching between the communication interval and the standby interval is performed. For example, in the case where the access point 12 alternately assigns the group A with a five-second communication permitted time and the group B with a three-second communication permitted time, the access point 12 notifies the terminals 131 to 133 and 141 to 142 about such communication permitted times. The terminals 131 to 133 and 141 to 142 switch between the communication interval and the standby interval according to the notified timings.

Second Embodiment

A wireless access system according to a second embodiment is different from that of the first embodiment in the operation of a communication control section. The communication control section according to the first embodiment determines the communication interval and the standby interval to be assigned to each group, according to the number of terminals belonging to each group. On the other hand, the communication control section according to the second embodiment determines the communication interval and the standby interval to be assigned to each group, according to the amount of transmission standby data held in terminals belonging to each group. Note that the operations of sections other than the communication control section are the same as those of the first embodiment.

Figure 6:
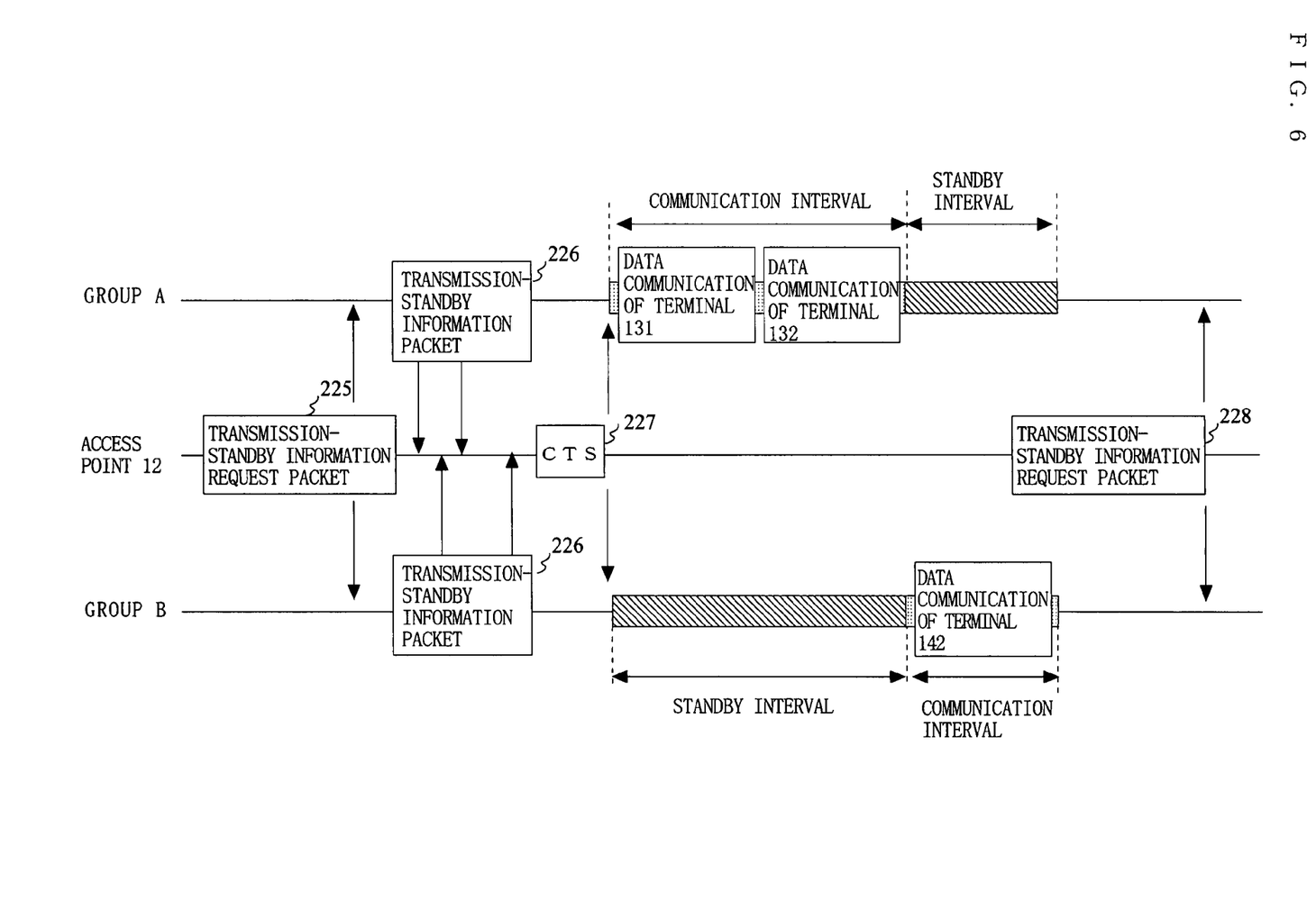
FIG. 6 is a diagram for explaining the operation of a communication control section according to a second embodiment.

FIG. 6 is a diagram for explaining the operation of the communication control section according to the second embodiment. Note that, in the description of FIG. 6 too, the operation of a first communication control section 12c is described as the operation of an access point 12 and the operation of a second communication control section 13c is described as the operation of a terminal. In FIG. 6, the access point 12 transmits, after the grouping of terminals 131 to 133 and 141 to 142 is complete, a transmission-standby information request packet 225 to all the terminals so as to know the actual amount of transmission standby data. The terminals 131 to 133 and 141 to 142 having received the transmission-standby information request packet 225 responds, if there is transmission standby data, to the access point 12 with a transmission-standby information packet 226 having set therein the length of transmission standby data.

The access point 12 determines the order and length of a communication interval to be assigned to groups A and B based on the length of transmission standby data set in the transmission-standby information packet 226. For example, assume that the amount of transmission standby data the access point 12 has actually received is such that the group A has 2 Kbytes of data in total and the group B has 1 Kbyte of data in total. In this case, the access point 12 can assign the group A having a greater amount of data with a two-second communication interval first, and then assign the group B with a one-second communication interval. The access point 12 sets in a CTS packet 227 specific information about terminals to which communication is permitted and the length of the communication interval, and transmits the CTS packet 227 to the terminals 131 to 133 and 141 to 142.

The terminals 131 to 133 and 141 to 142 determine that the terminals 131 to 133 and 141 to 142 are in a communication interval or a standby interval, based on the received CTS packet 227, and performs data communication with the access point 12. The operation of the terminals 131 to 133 and 141 to 142 after receiving the CTS packet 227 is the same as that of the first embodiment. Once a sequence of data communication has completed between the access point 12 and the terminals 131 to 133 and 141 to 142, the access point 12, once again, transmits a transmission-standby information request packet 228 to the terminals 131 to 133 and 141 to 142. By repeating the aforementioned operation, the wireless access system can prevent the occurrence of the hidden terminal problem between terminals which cannot receive from each other radio waves transmitted therefrom.

As described above, according to the wireless access system of the second embodiment of the present invention, the communication interval and the standby interval to be assigned to each group are determined according to the amount of transmission standby data held in terminals belonging to each group. Therefore, the wireless access system can assign the communication interval and the standby interval according to the actual amount of traffic, and accordingly, communication efficiency can be increased.

Figure 7:
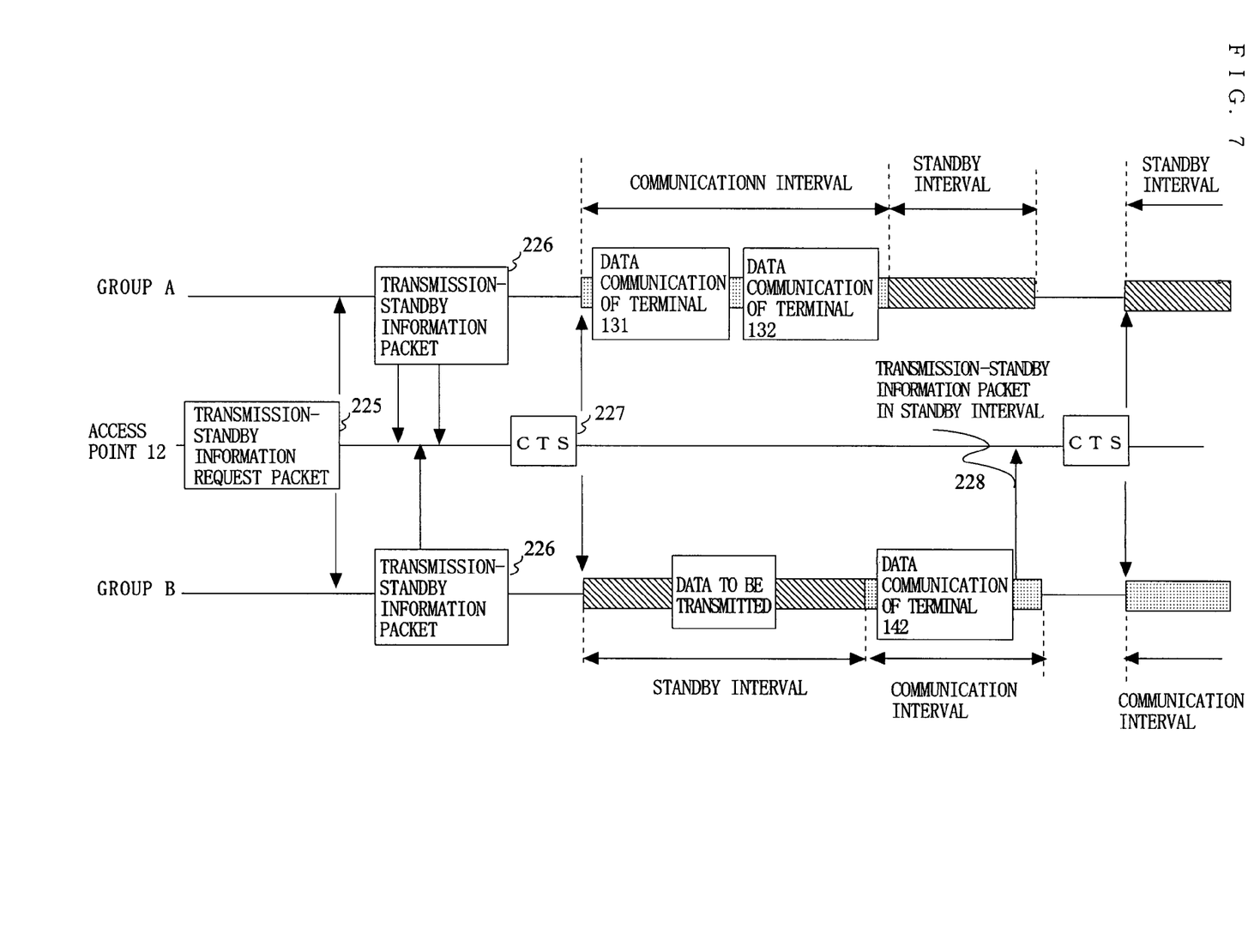
FIG. 7 is a diagram for explaining the operation of a wireless access system which transmits, during a communication interval, the length of data generated during a preceding standby interval.

In the wireless access system according to the second embodiment, the terminals 131 to 133 and 141 to 142 may transmit the length of data generated during a preceding standby interval (namely, transmission standby data), during the following communication interval. FIG. 7 is a diagram for explaining the operation of a wireless access system which transmits, during a communication interval, the length of data generated during a preceding standby interval. With reference to FIG. 7, the case is considered where, for example, data to be transmitted is generated from one of the terminals belonging to group B during a standby interval. In this case, the one of the terminals belonging to the group B transmits to the access point 12 a transmission-standby information packet 228 in which the length of the transmission data generated during the standby interval is set.

The access point 12 can determine the order and length of a communication interval to be assigned to the groups A and B based on the received transmission-standby information packet 228. This eliminates the need for the access point 12 to inquire, using the transmission-standby information request packet 225, about the transmission standby data generated during the standby interval, and therefore the access point 12 can perform efficient communication in which the reduction in throughput is minimized.

Third Embodiment

Figure 8:
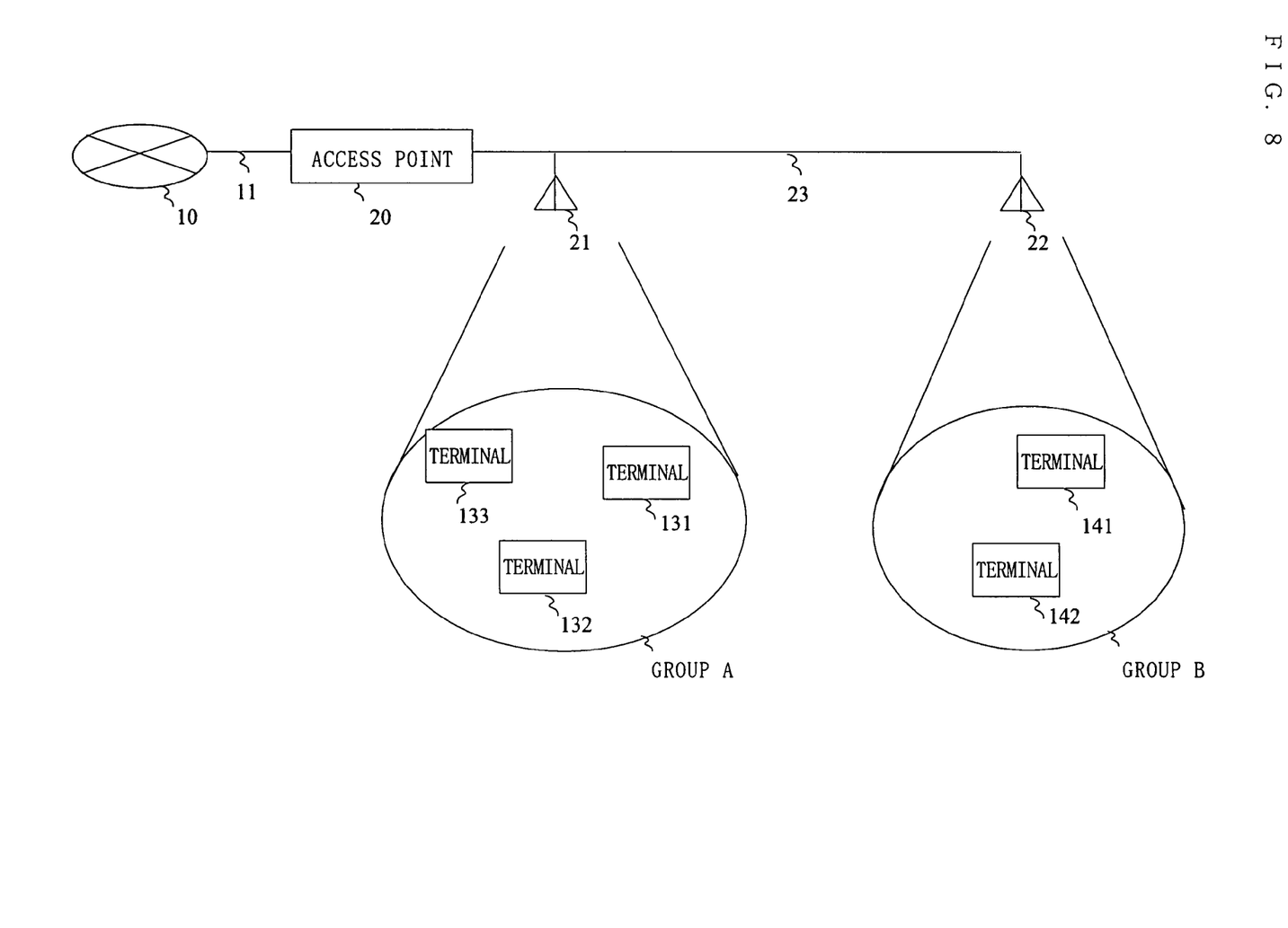
FIG. 8 is a diagram showing an exemplary network configuration of a wireless access system according to a third embodiment.

FIG. 8 is a diagram showing an exemplary network configuration of a wireless access system according to a third embodiment. The wireless access system according to the third embodiment includes an access point 20 having a plurality of remote antennas, and thus can cover a wide communication area. In FIG. 8, the wireless access system according to the third embodiment includes the access point 20, a remote antenna 21, a remote antenna 22, a transmission line 23, and a plurality of terminals 131 to 133 and 141 to 142. The access point 20 performs communication with the terminals 131 to 133 via the remote antenna 21, and with the terminals 141 to 142 via the remote antenna 22. Note that the transmission line 23 may be free space which is connected by a radio signal.

Here, it is assumed that the terminals 131 to 133 cannot receive radio waves transmitted from the terminals 141 to 142 for the reason that the remote antenna 21 and the remote antenna 22 are located far away from each other, or the like. It is also assumed that the terminals 141 to 142 cannot receive radio waves transmitted from the terminals 131 to 133. In such a case, as with the wireless access system according to the first embodiment, the wireless access system according to the third embodiment groups the terminals 131 to 133 as group A and the terminals 141 to 142 as group B, and then assigns a communication interval and a standby interval to each group. By doing so, the wireless access system according to the third embodiment can prevent the occurrence of the hidden terminal problem between terminals which cannot receive from each other radio waves transmitted therefrom.

As described above, according to the wireless access system of the third embodiment, as with the wireless access systems of the first and second embodiments, the occurrence of the hidden terminal problem can be prevented. Further, by providing a plurality of remote antennas to a single access point 20, a wider communication area can be covered.

Fourth Embodiment

Figure 9:
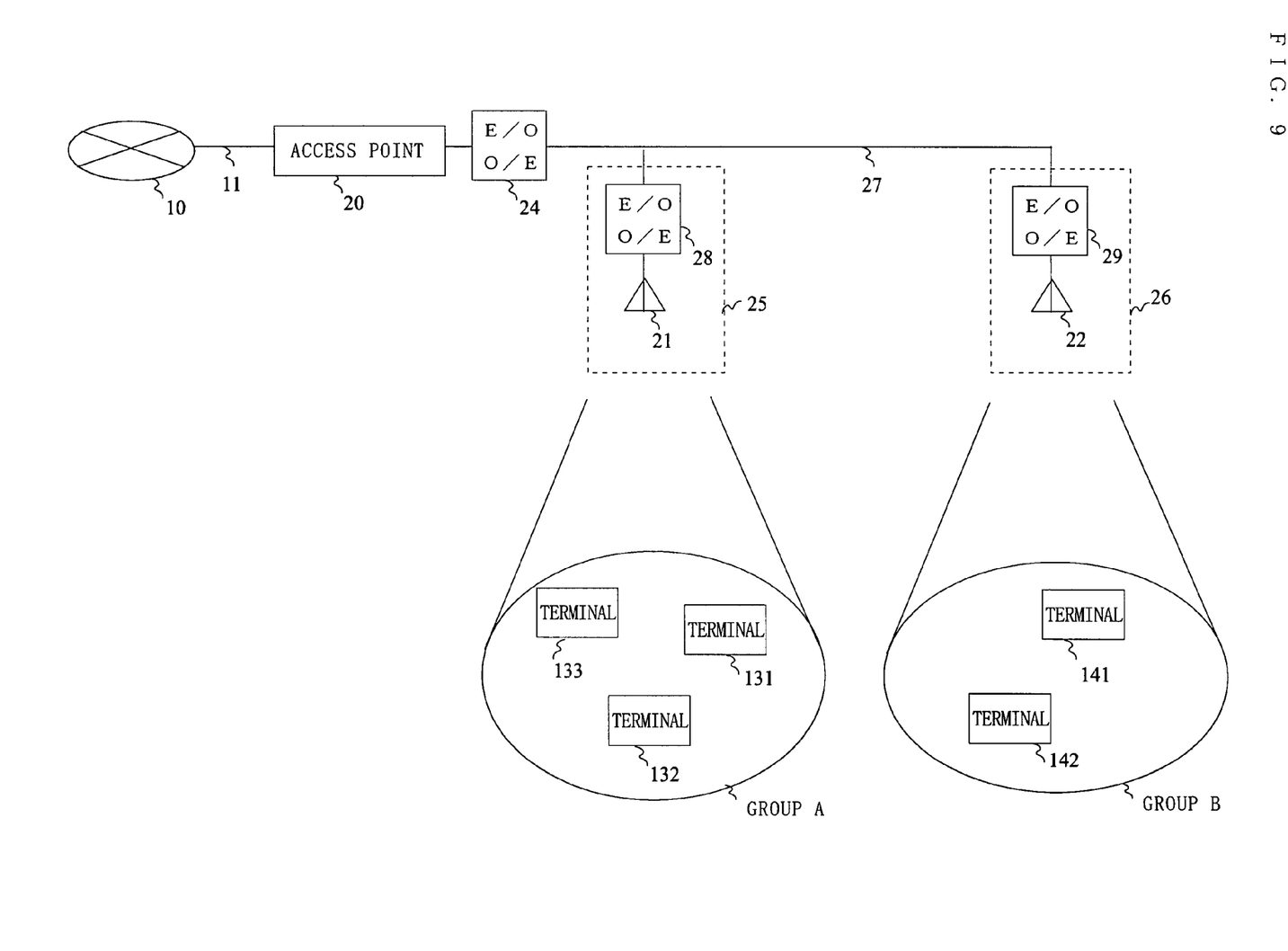
FIG. 9 is a diagram showing an exemplary network configuration of a wireless access system according to a fourth embodiment.

FIG. 9 is a diagram showing an exemplary network configuration of a wireless access system according to a fourth embodiment. The wireless access system according to the fourth embodiment is such that the communication between the access point 20 and the remote antennas 21 and 22 in the wireless access system according to the third embodiment is replaced with communication using an optical signal. In FIG. 9, the wireless access system according to the fourth embodiment includes an access point 20, an electrical-optical/optical-electrical conversion section 24, a remote antenna unit 25, a remote antenna unit 26, an optical transmission line 27, and a plurality of terminals 131 to 133 and 141 to 142.

The optical-electrical/electrical-optical conversion section 24 converts an electrical signal inputted from the access point 20 into an optical signal, and also converts an optical signal inputted from the optical transmission line 27 into an electrical signal and outputs the electrical signal to the access point 20. The optical transmission line 27 connects between the electrical-optical/optical-electrical conversion section 24 and the remote antenna units 25 and 26. For the optical transmission line 27, an optical fiber cable is used, for example. The remote antenna units 25 and 26 each convert an optical signal inputted from the optical transmission line 27 into a radio signal and transmit the radio signal to free space, and also convert a radio signal received from the terminals 131 to 133 and 141 to 142 into an optical signal and transmit the optical signal to the optical transmission line 27. The remote antenna unit 25 is composed of an antenna 21 and an optical-electrical/electrical-optical conversion section 28. The remote antenna unit 26 is composed of an antenna 22 and an optical-electrical/electrical-optical conversion section 29.

As with the wireless access system according to the third embodiment, the wireless access system according to the fourth embodiment groups the terminals 131 to 133 as group A, and the terminals 141 to 142 as group B, and then assigns a communication interval and a standby interval to each group. By doing so, the wireless access system according to the fourth embodiment can prevent the occurrence of the hidden terminal problem between terminals which cannot receive from each other radio waves transmitted therefrom.

As described above, according to the wireless access system of the fourth embodiment, as with the wireless access system of the third embodiment, the occurrence of the hidden terminal problem can be prevented. Further, since a plurality of antenna units can be installed in a wide range using the optical transmission line 27, it is possible to expand the communication area which can be covered by a single access point 20.

Figure 10:
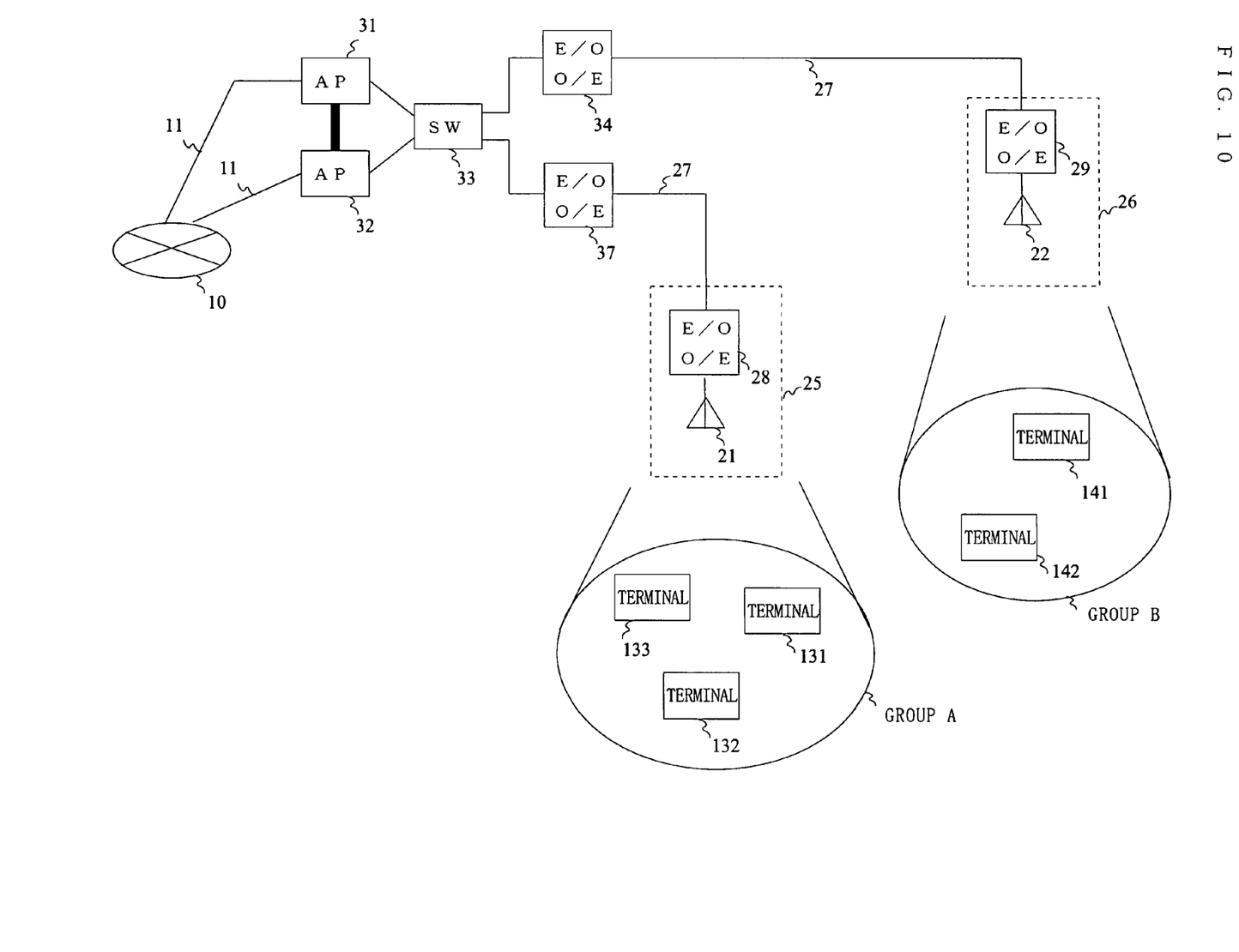
FIG. 10 is a diagram showing an exemplary network configuration of a wireless access system which performs switching between a plurality of access points.

Note that the wireless access system according to the fourth embodiment may be configured such that a plurality of access points are provided and the plurality of access points are switched from one to another using a switch. FIG. 10 is a diagram showing an exemplary network configuration of a wireless access system which performs switching between a plurality of access points. In FIG. 10, the wireless access system switches between an access point 31 and an access point 32 using a switch 33. This allows the terminals 131 to 133 and 141 to 142 to communicate with any access point. The wireless access system switches between the access points 31 and 32 based on the difference in the communication method of the terminals, for example. By this, even in the case where terminals using different communication methods are present, the wireless access system can prevent the occurrence of the hidden terminal problem.

INDUSTRIAL APPLICABILITY

The wireless access system of the present invention is useful as a method of solving the hidden terminal problem which occurs, for example, in a wireless LAN system, or the like.

The invention claimed is:

1. A wireless access system for performing transmission and reception of data using a radio wave, the wireless access system comprising:
   a plurality of terminals each performing transmission and reception of a radio wave in accordance with a predetermined instruction; and
   an access point which
      divides the plurality of terminals into groups so as to create a plurality of groups of terminals, the plurality of groups each having terminals which can receive from each other radio waves transmitted therefrom, and
      provides to the plurality of terminals the predetermined instruction to give a communication permission, the communication permission allowing only one of the plurality of groups to communicate with the access point.

2. The wireless access system according to claim 1, further comprising:
   at least one remote antenna which performs, in a location away from the access point, transmission and reception of a radio wave with any of the plurality of terminals; and a transmission line which connects between the remote antenna and the access point.

3. The wireless access system according to claim 2, wherein the transmission line is an optical transmission line through which an optical signal is transmitted, and the wireless access system further comprises:

an electrical-optical/optical-electrical conversion section for converting an electrical signal inputted via the access point into an optical signal and outputting the optical signal to the optical transmission line, and for converting an optical signal inputted via the optical transmission line into an electrical signal and outputting the electrical signal to the access point; and an optical-electrical/electrical-optical conversion section for converting an optical signal inputted via the optical transmission line into an electrical signal and outputting the electrical signal to the remote antenna, and for converting an electrical signal inputted via the remote antenna into an optical signal and outputting the optical signal to the optical transmission line.

4. The wireless access system according to claim 3, wherein the optical transmission line is an optical fiber cable.

5. The wireless access system according to claim 1, further comprising:

at least one remote antenna which performs, in a location away from the access point, transmission and reception of a radio wave with any of the plurality of terminals, wherein the access point and the at least one remote antenna are able to communicate via a wireless connection.

6. The wireless access system according to claim 1, wherein the access point provides, as the predetermined instruction, to the plurality of terminals specific information about and a communication permitted time for terminals which are included in a group to which the communication permission is given.

7. The wireless access system according to claim 6, wherein the access point sets a predetermined time for the communication permitted time.

8. The wireless access system according to claim 6, wherein the access point determines the communication permitted time in accordance with an instruction from an operator.

9. The wireless access system according to claim 6, wherein the access point determines the communication permitted time according to a number of terminals included in the plurality of groups.

10. The wireless access system according to claim 6, wherein the access point determines the communication permitted time according to an amount of transmission standby data held in the terminals included in the plurality of groups.

11. The wireless access system according to claim 1, wherein the access point includes:

a first group creation section for transmitting a response request packet to each of the plurality of terminals in any order, receiving, as a response to the response request packet, a response packet from each of the terminals, and then creating the plurality of groups based on specific information set in each of the received response packets, and the terminals each include:

a second group creation section for setting, in the response packet, specific information about its own terminal and specific information received from other terminals, and responding to the access point with the response packet as a response to the response request packet received from the access point.

12. The wireless access system according to claim 11, wherein the access point further includes:

a first communication control section for setting, in a case where the access point receives from any of the plurality of terminals an RTS packet as a transmission request, specific information about and a communication permitted time for terminals which are included in a group from which the RTS packet has been transmitted, in a CTS packet as an instruction to give the communication permission, and transmitting the CTS packet to the plurality of terminals, and the terminals each further include:

a second communication control section for transmitting, in a case where data to be transmitted is generated, the RTS packet to the access point, receiving from the access point the CTS packet as a response to the RTS packet, and determining, if the specific information set in the received CTS packet contains specific information about its own terminal, that the communication permission is given to its own terminal, and performing communication with the access point for a period of the communication permitted time.

13. A wireless access method of performing transmission and reception of data using a radio wave, for use with:

a plurality of terminals each performing transmission and reception of a radio wave in accordance with a predetermined instruction; and an access point which divides the plurality of terminals into groups so as to create a plurality of groups of terminals, the plurality of groups each having terminals which can receive from each other radio waves transmitted therefrom, and provides to the plurality of terminals the predetermined instruction to give a communication permission, the communication permission allowing only one of the plurality of groups to communicate with the access point, the wireless access method comprising:

in the access point:

transmitting a response request packet to the plurality of terminals in any order;

receiving, as a response to the response request packet, a response packet from each of the terminals; and creating the plurality of groups based on specific information set in each of the received response packets, and in each of the terminals:

receiving the response request packet from the access point; and setting, in the response packet, specific information about its own terminal and specific information received from other terminals, and responding to the access point with the response packet as a response to the response request packet.

14. The wireless access method according to claim 13, further comprising:

in the access point:

setting, in a case where the access point receives from any of the plurality of terminals an RTS packet as a transmission request, specific information about and a communication permitted time for terminals which are included in a group from which the RTS packet has been transmitted, in a CTS packet as an instruction to give the communication permission; and transmitting the CTS packet to the plurality of terminals, and in each of the terminals:
  transmitting, in a case where data to be transmitted is generated, the RTS packet to the access point;
  receiving from the access point the CTS packet as a response to the RTS packet; and
  determining, if the specific information set in the received CTS packet contains specific information about its own terminal, that the communication permission is given to its own terminal, and performing communication with the access point for a period of the communication permitted time.

* * * * *